April 21, 1953  V. R. GOELLER  2,635,703
WHEEL CHAIR ADAPTED FOR OPTIONAL OPERATION
BY POWER OR MANUALLY
Filed May 19, 1950  3 Sheets-Sheet 3
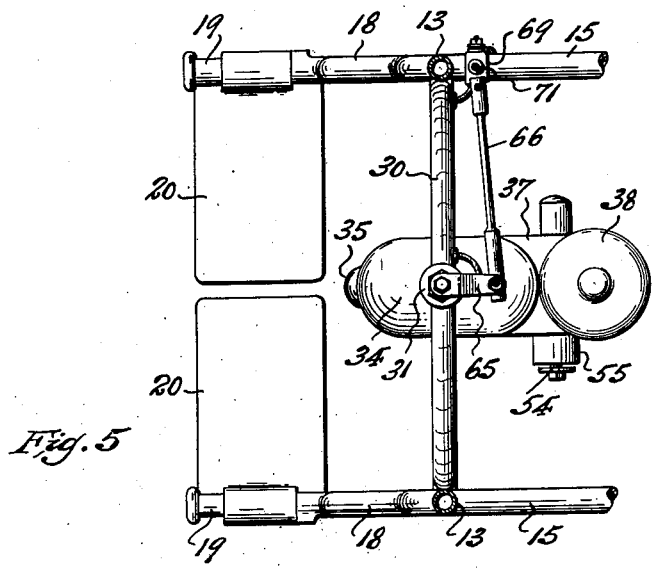
Fig. 5
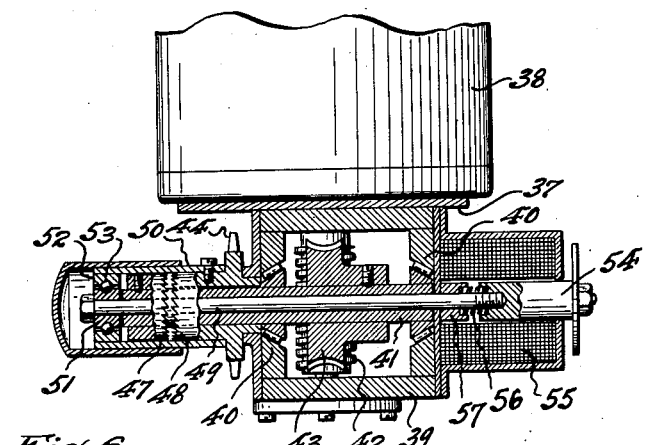
Fig. 6
Fig. 7
INVENTOR.
Vernon R. Goeller,
BY
George D. Richards,
Attorney Patented Apr. 21, 1953

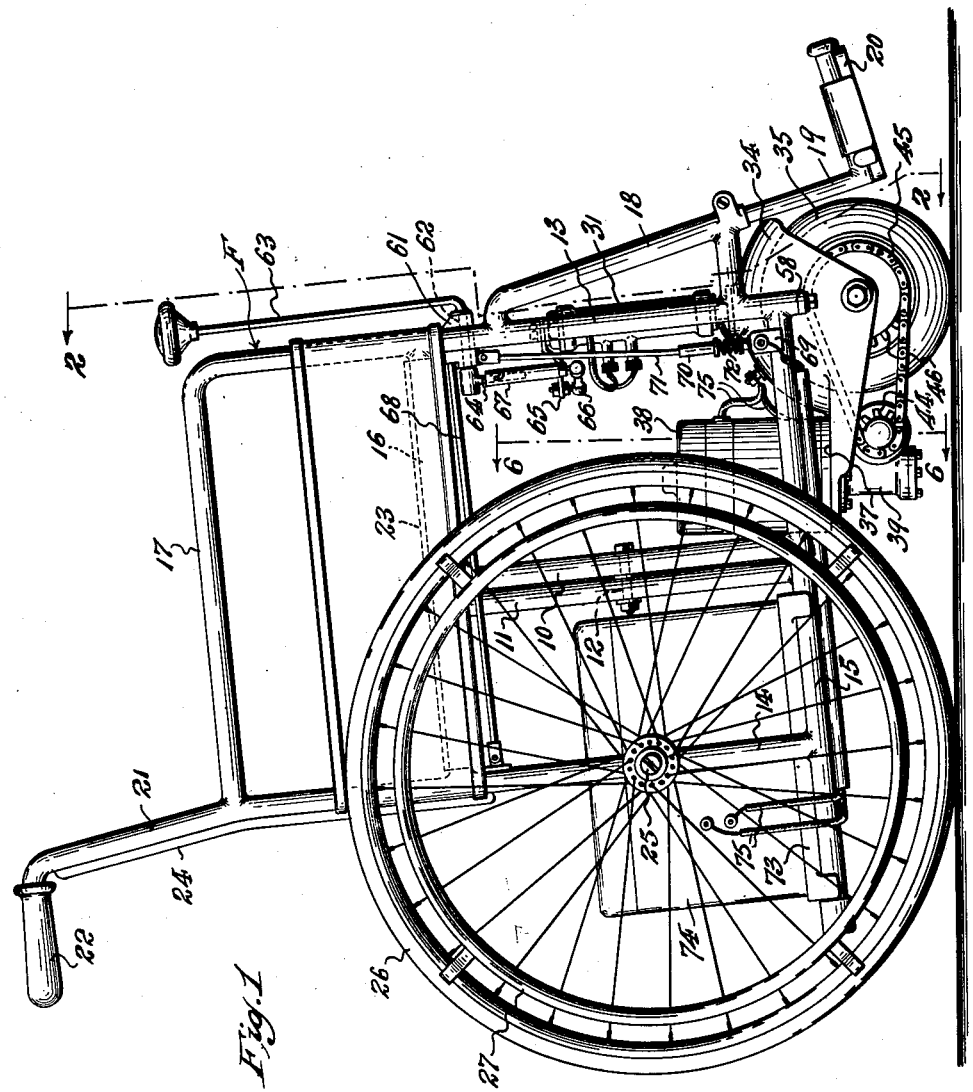

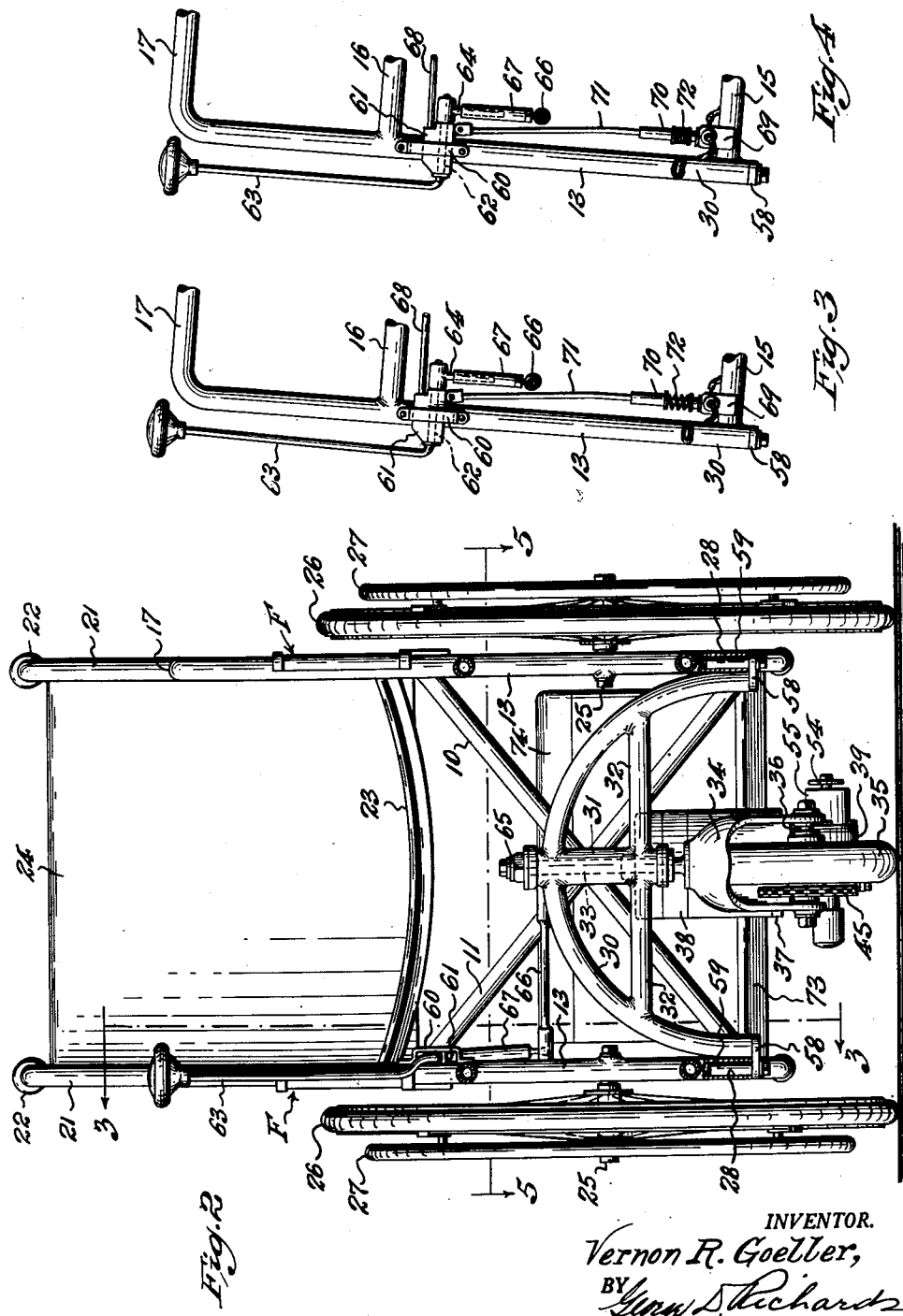

2,635,703

UNITED STATES PATENT OFFICE 2,635,703

WHEEL CHAIR ADAPTED FOR OPTIONAL OPERATION BY POWER OR MANUALLY

Vernon R. Goeller, Mountain Lakes, N. J., assignor of one-half to Norman V. Grimes, Mountain Lakes, N. J.

Application May 19, 1950, Serial No. 163,031

4 Claims. (Cl. 180—13)

This invention relates to a wheel chair adapted to be optionally operated by electric power or manually by its occupant.

Power driven wheel chairs utilizing an electric motor as the power source for driving a traction wheel are known to the art, but as heretofore constructed the power transmission from the motor to the traction wheel was direct, so that when the motor was de-energized the traction wheel could not move freely, i. e. independently of the motor, and consequently manual operation of the chair by its occupant would be so strongly impeded by the drag of the idle motor that such manual operation was substantially impractical. Furthermore, in some cases brake mechanism was additionally utilized whereby a brake would be set when the motor was deenergized, which thereupon entirely prohibited manual operation of the chair, and limited use of the chair solely to power operation.

Having the above in view, it is a primary object of this invention to provide a wheel chair with a traction wheel adapted to be power driven by an electric motor through transmisison means including automatic clutch means, whereby, when the motor is deenergized, the clutch means will release and leave the traction wheel free to revolve independently of the motor, so that the chair can thereupon be manually operated by its occupant with ease.

A further object of the invention is to provide, in combination with a power driven traction wheel mechanism characterized as above stated, means to control both transmission of power to the traction wheel and movement of the traction wheel for steering the chair by a single manipulatable control lever which is conveniently located for operation by the chair occupant.

Another object of the invention is to provide a power driven traction wheel unit which is demountably attachable to the frame of a wheel chair, whereby said unit can be readily removed from the chair, and the chair thereupon converted for use solely by manual operation.

Other objects and advantages of the invention will become apparent as the following description thereof is read in connection with the accompanying drawings, in which:

Fig. 1 is a side elevational view of a wheel chair as equipped with a power driven traction wheel mechanism according to this invention;
Fig. 2 is a transverse vertical sectional view of the same, taken on line 2—2 in Fig. 1; Fig. 3 is a fragmentary vertical sectional view taken on line 3—3 in Fig. 2, showing the control lever and associated mechanism in an initial power cut off position; and Fig. 4 is a view similar to that of Fig. 3, but showing the control lever in power service position.

Fig. 5 is a fragmentary horizontal section, taken on line 5—5 in Fig. 2.

Fig. 6 is a fragmentary transverse vertical section, taken on line 6—6 in Fig. 1 through the clutch means of the motor power transmission to the traction wheel, this view being drawn on an enlarged scale.

Fig. 7 is a wiring diagram showing the parallel circuits and switch means for controlling the operations of the solenoid actuated clutch and the motor by which power is transmitted to the traction wheel.

Similar characters of reference are employed in the above described views, to indicate corresponding parts.

Referring to the drawings, the wheel chair shown therein is of a well known collapsible type comprising a pair of side frames F which are normally spread apart in laterally spaced operative positions by collapsible crossed strut members 10 and 11 which are connected therebetween and centrally pivoted together at 12, whereby the side frames F may be closed together when the chair is collapsed for storage or transportation.

Each side frame F comprises a tubular front leg 13 and a similar rear leg 14 which are connected by a bottom bar 15, a seat supporting bar 16, and an arm rest forming bar 17, all as unitary parts of the side frame structure. The front leg 13 of each side frame F is provided with a supporting bracket section 18 which extends forwardly and downwardly therefrom, and to which is secured a carrier member 19 by which a foot rest plate 20 is carried; the latter being pivotally connected with the carrier member subject to up-folding movement into the plane of the side frame when the chair is collapsed. The rear leg 14 of each side frame F is provided at its upper end with an extension 21 which projects upwardly beyond the arms rest forming bar 17. Said extension 21 terminates at its upper free end in a rearwardly directed handle or hand grip means 22. These handle or hand grip means 22 are for use by an attendant if the chair and its occupant is desired to be propelled by such attendant. A flexible seat member 23 is connected between and supported by the seat supporting bars 16 of the chair side frames. Similarly a flexible back member 24 is connected between and supported by the upper end portions of the rear legs 14 and the extension 21 thereof.

Supported by axle bolt means 25, which project outwardly from the rear legs 14 of the side frames F, are the main side wheels 26 of the chair. These side wheels are of large diameter, and secured to the same, in outwardly offset concentric relation thereto, are circular hand grip members 27 by which, when desired, the chair may be manually operated by its occupant.

The lower ends of the tubular front legs are open so that the interiors thereof provide sockets 28. Ordinarily the shanks of front caster wheels (not shown) are supported in said sockets, but when the chair is provided with the power driven traction wheel unit of this invention, said front caster wheels are removed so that the sockets 28 can be utilized for the attachment to and between the front legs 13 of the supporting frame of said unit, as and in the manner hereinafter more particularly set forth.

The power traction wheel unit comprises a transverse arcuate or arched bolster 30 which is preferably made of tubular metallic stock. Connected with the mid-portion of the bolster frame, so as to be unitary therewith, is a perpendicular swivel bearing 31. The connection of the swivel bearing 31 with the bolster frame 30 is further reenforced by transverse brace bars 32 which extend between said bearing and the opposite sides of the bolster frame, whereby a strong and rigid support of said bearing is assured. Journaled in the swivel bearing 31 is the swivel shaft 33 which extends upwardly from a traction wheel housing or fork 34. The traction wheel 35 is rotatably mounted between the sides of said housing or fork 34 with its axle 36 journaled in said housing or fork sides.

Formed as a unitary and preferably as an integral part of the housing or fork 34, to extend rearwardly therefrom, is a horizontal platform 37 upon which is mounted an electric motor 38 which serves as a source of power for driving the traction wheel. The motor is so positioned that its armature shaft is perpendicular to the plane of the platform 37. Affixed to the platform 37, so as to depend therefrom, is a gear box 39 into which the armature shaft of the motor extends. Extending transversely through the gear box 39, and supported by bearings 40 mounted within the latter, is a driven shaft 41 which is driven by the motor 38 through worm gearing which comprises a worm gear 42 fixed on the motor armature shaft to mesh with a worm wheel 43 which is fixed on said driven shaft 41.

The traction wheel 35 is driven by power transmission means comprising a drive sprocket 44 which transmits power by chain 45 which runs over a driven sprocket 46 that is affixed to axle 36 of said traction wheel.

According to this invention, self-releasing automatic clutch mechanism is interposed between the driven shaft 41 and the drive sprocket 44, which clutch mechanism is designed to automatically connect said driven shaft in driving relation to said drive sprocket substantially simultaneously as the motor 38 is energized and started. Such clutch mechanism may be of any suitable kind, form or construction which is adapted to function in the above stated manner. An illustrative and perhaps preferred form of clutch mechanism which is adapted to so function comprises, as shown, a toothed driver clutch element 47 which is fixed on the driven shaft 41 and which is opposed to a correspondingly toothed driven clutch element 48 which is affixed to or which forms a part of the drive sprocket 44. The driven shaft 41 is hollow, and extending therethrough is a slidable clutch actuating rod 49 to one end of which is connected, for movement therewith, a sleeve 50 which is unitary with the drive sprocket 44. The coupling connection between the clutch actuating rod 49 and sleeve 50 is such that although longitudinal movements of said clutch actuating rod are transmitted therethrough to said sleeve, at the same time the latter is free to rotate relative to the former. To this end, said coupling connection comprises an anti-friction bearing formed by an inner member 51 which is affixed to the clutch actuating rod 49 and an outer, relatively rotatable member 52 concentric thereto which is affixed to the sleeve 50; said members 51 and 52 being keyed together by interposed ball-bearings 53. To the opposite end of the clutch actuating rod 49 is affixed the movable armature 54 of a solenoid 55 which is suitably supported in connection with the gear box 39. A compression spring 56 is interposed between the solenoid armature 54 and a stationary thrust block 57. This spring 56 operates to move the solenoid to outward normal initial position when the solenoid is deenergized, whereby to dispose the clutch actuating rod 49 in corresponding normal initial position by which the driven clutch element 48 is disengaged from the driver clutch element 47 (see Fig. 6).

The solenoid 55 of the illustrative form of automatic clutch mechanism above described is connected to a source of electrical energy in a circuit parallel to the circuit of the motor 38 served by said source, and both circuits are arranged to be controlled by a manipulatable switch means common thereto (see Fig. 7) as will be presently more particularly described. It will, therefore, be obvious that closing of the switch means simultaneously serves operating current to the motor and operating current to the solenoid, and, consequently, as the motor starts, the solenoid will be energized to attract and move its armature so as to slide forward the clutch actuating rod 49 against the tension of the spring 56. Such movement of said clutch actuating rod shifts the drive sprocket 44 and its driven clutch element 48 so as to engage the latter with the driver clutch element 47, and thereupon holds the clutch engaged so long as the motor 38 operates, so that the power of the motor is transmitted to and revolves the traction wheel 35. On the other hand, when the circuits are interrupted the motor will stop, and substantially simultaneously the solenoid will be deenergized, so that the clutch actuating rod and solenoid armature will be moved by the spring 56 back to clutch releasing normal initial positions. When the clutch is thus released, the traction wheel 35 becomes free wheeling, that is can freely revolve unimpeded by the drag of the motor, and therefore the chair can be manually operated by its occupant without undue effort.

From the above it will be apparent that the traction wheel and its mounting together with the driving motor and clutch included transmission as supported in swiveling connection with the bolster frame constitutes a unit assembly ready for detachable connection to and between the forward legs of a wheel chair. The means for attaching this unit assembly to the chair may be varied to suit the particular style of wheel chair to which attachment is desired to be made. The means for detachably connecting the unit assembly to the style of wheel chair shown in the accompanying drawings and hereinabove described comprises the provision, in connection with the opposite ends of the bolster frame 30, of laterally projecting foot pieces 58 to which are affixed upstanding coupling pins or dowels 59. These coupling pins or dowels 59 are adapted to be inserted in the sockets 28 with which the front legs 13 of the chair are provided (see Fig. 2), thus coupling the bolster frame 30 to said front legs 13 in transverse extension therebetween, and so as to dispose the traction wheel 35 in operative position midway between said front legs of the chair.

For cooperation with the traction wheel unit assembly, when the same is mounted in operative relation to the wheel chair, means, manipulatable by the chair occupant, is provided for control of both transmission of power to the traction wheel, as well as swiveling movement of said wheel for steering the chair when in motion. An illustrative and preferred construction and arrangement of means for these purposes, as shown, comprises the following control mechanism:

Supported in connection with a front leg 13 of one of the side frames F of the chair is a guideway member 60 which embraces a bearing block 61 which is subject to vertical up and down movement within the embrace of said guideway member. Journaled in said bearing block 61 is a crank arm 62 of a control lever 63 which extends upwardly from the forward end thereof adjacent to the front of said side frame, so that the upper free end of said control lever is conveniently accessible to the hand of the chair occupant. Affixed to the rearward end portion of the crank arm 62 is a dependent lever arm 64. Affixed to the upper end of the swivel shaft 33 of the traction wheel unit assembly is a steering lever arm 65. Pivotally connected with said steering lever arm 65 is one end of a link 66, to the opposite end of which is pivotally connected a coupler sleeve 67 which is adapted to detachably and telescopically receive the lever arm 64, whereby to operatively couple the latter with the link 66. To retain the bearing block 61 against displacement from the guideway member 60, and yet free to move up and down within the embrace thereof, a tie link 68 is pivotally interconnected between a rearward portion of said chair side frame F and said bearing block. Mounted on the bottom bar 15 of said chair side frame F is an electric switch element 69 which is adapted to be opened and closed by a push finger member 70. Said push finger member 70 is connected with the bearing block 61 by a link 71. The thus related parts of the control mechanism are yieldably sustained in an uplifted position (see Fig. 3) by a compression spring 72 which is interposed between the switch device 69 and the push-finger element 70, thereby normally holding the latter in circuit interrupting relation to the switch device. Bridging the bottom bars 15 of the chair side frames F is a supporting plate or shelf 73 upon which is mounted a battery case 74 which contains electrical storage batteries for service as the source of electrical energy for the motor 38 of the traction wheel assembly unit. A suitable arrangement of electrical conductors 75 are provided to connect the batteries through the switch device with the motor 38 and the solenoid 55, said conductors being led in part through the bolster frame 30 and traction wheel housing or fork 34.

In the operation of the above described control mechanism, the occupant of the wheel chair, being seated therein, grasps the control lever 63 and pushes downwardly thereon. Such downward movement of the control lever slides the bearing block 61 downwardly in the guideway member 60, thus imparting a downward thrust upon the link 71 to thereby push down the push-finger member 70 whereby to close the switch 69. The switch 69 being closed, current is supplied to the motor 38 to start operation thereof, and simultaneously current is also supplied to the solenoid 55, whereby the clutch mechanism is engaged so that the power of the motor is transmitted to the traction wheel 35, and the latter thereupon operates to propel the chair and its occupant. While thus holding the control lever 63 in down thrust position, the occupant of the chair may now steer the forwardly moving chair by swinging the control lever 63 to right or left as occasion requires. It will be obvious that if the control lever 63 is moved to the right about the crank arm 62 as a pivot, the lever arm 64 and coupling sleeve 67 will be swung to the left, and through the link 66 will turn the steering lever arm 65 to the left, thereby turning the swivel shaft 33 clockwise whereby to turn the traction wheel 35 to the right so that the moving chair will veer or move to the right. Movement of the control lever 63 to the left will reverse these operations so that the chair will be caused to veer or move to the left. In this way the direction of advance of the driven chair may be easily controlled and changed by the occupant at will. It will also be understood that so long as the chair occupant holds the control lever 63 in its down thrust position, the switch 69 is held closed and the chair will continue to be power driven. To stop the chair, the occupant merely permits the control lever 63 to rise under the thrust of the spring 72, thus opening the switch 69 and interrupting flow of operating current to the motor 38 and to the solenoid 55. The solenoid is thereupon deenergized so that the spring 56 moves the clutch actuating rod 49 and solenoid armature 54 back to normal initial positions, whereby to disengage the clutch elements 47—48. When the clutch is thus released, the traction wheel 35 becomes free wheeling as above explained, so that the occupant of the chair may, if so desired, then operate the chair manually by means of a hand grip member 27, while still maintaining steering control of the chair movement by manipulation of the control lever 63.

Having now described my invention, I claim:

1. In a wheel chair adapted to be manually propelled by its occupant, an optionally usable power actuated driving means for said chair comprising a swiveling traction wheel fork supported by the chair framework, a traction wheel rotatably mounted in said fork, a platform carried by said fork, an electric motor supported on said platform, power transmission means including a magnetic clutch for driving the traction wheel by the motor, a source of electrical energy carried by the chair, circuit connections including switch means to connect said source of electrical energy to both the motor and magnetic clutch to simultaneously control the same, and chair occupant manipulatable means to effect steering movements of the traction wheel, said latter means comprising a bearing block, means for mounting said bearing block on the chair framework subject to limited up and down movement, a manipulatable control lever pivotally supported by the bearing block for swinging movement, said control lever being also longitudinally reciprocable whereby to effect up and down movements of said bearing block, a steering lever arm affixed to the tractional wheel fork, linkage interconnecting the control lever and steering lever arm whereby swinging movement of the former is transmitted to the latter for traction wheel steering effect, and means connected with the bearing block adapted to be actuated by up and down movements thereof whereby to control operation of said switch means.

2. In a wheel chair adapted to be manually propelled by its occupant, an optionally usable power actuated driving means for said chair comprising a bolster frame extending between the sides of the chair framework, said bolster frame having a perpendicular swivel bearing, a traction wheel housing fork having a swivel shaft mounted in said bearing, a traction wheel rotatably mounted in said fork, a horizontal platform unitary with and projecting from said fork, an electric motor carried by said platform, power transmission means including a magnetic clutch for driving the traction wheel by the motor, a source of electrical energy carried by the chair, circuit connections including switch means to connect said source of electrical energy to both the motor and magnetic clutch to simultaneously control the same, and chair occupant manipulatable means to effect steering movements of the traction wheel, said latter means comprising a bearing block, means for mounting said bearing block on the chair subject to limited up and down movement, a manipulatable control lever pivotally supported by the bearing block for swinging movement, said control lever being also longitudinally reciprocable whereby to effect up and down movements of said bearing block, a steering lever arm affixed to the swivel shaft of the traction wheel housing fork, linkage interconnecting said control lever and steering lever arm whereby swinging movement of the former is transmitted to the latter for traction wheel steering effect, and means connected with the bearing block adapted to be actuated by up and down movements thereof whereby to control operation of said switch means.

3. In a wheel chair adapted to be manually propelled by its occupant, an optionally usable power actuated driving means for said chair comprising a bolster frame extending between the sides of the chair framework, said bolster frame having a perpendicular swivel bearing, a traction wheel housing fork having a swivel shaft mounted in said bearing, a traction wheel rotatably mounted in said fork, a horizontal platform unitary with and projecting rearwardly from said fork, an electric motor supported on said platform, a power shaft driven by said motor, a sprocket and chain transmission for driving the traction wheel, a magnetic clutch mechanism between said power shaft and transmission, a source of electrical energy carried by the chair, circuit connections including switch means to connect said source of electrical energy to both the motor and magnetic clutch mechanism to simultaneously control the same, and chair occupant manipulatable means to effect steering movements of the traction wheel, said latter means comprising a bearing block, means for mounting said bearing block on the chair subject to limited up and down movement, a manipulatable control lever pivotally supported by the bearing block for swinging movement, said control lever being also longitudinally reciprocable whereby to effect up and down movements of said bearing block, a steering lever arm affixed to the swivel shaft of the traction wheel housing fork, linkage interconnecting said control lever and steering lever arm whereby swinging movement of the former is transmitted to the latter for traction wheel steering effect, and means connected with the bearing block adapted to be actuated by up and down movements thereof whereby to control operation of said switch means.

4. In a wheel chair having side frames provided with side wheels adapted to be manipulated by the chair occupant for manual propulsion of the chair, said chair side frames having front leg portions provided with downwardly open sockets in their lower ends for reception of removable casters, an optionally usable power actuated driving unit for the chair, means to detachably mount said unit in operative assembled relation to the chair, said means comprising an upwardly arched bolster frame including a perpendicular swivel bearing midway of its ends, the ends of said bolster frame having outwardly offset upstanding coupling dowels adapted to be received in the sockets of said chair front legs upon removal of casters therefrom whereby to dispose the bolster frame in transverse extension between the chair side frames, said power actuated unit comprising a traction wheel, a housing fork for the traction wheel having a swivel shaft journaled in the swivel bearing of the bolster frame, a horizontal platform unitary with and projecting from said fork, an electric motor carried by said platform, power transmission means for driving the traction wheel by the motor, and a steering lever arm affixed to the swivel shaft adapted to be connected with control means manipulatable by the chair occupant.

VERNON R. GOELLER.

References Cited in the file of this patent

UNITED STATES PATENTS

| Number | Name | Date |
|---|---|---|
| 600,200 | Hiatt | Mar. 8, 1898 |
| 1,019,091 | Sacerdoti | Mar. 5, 1912 |
| 2,244,216 | Pieper | June 3, 1941 |
| 2,263,081 | Fulton | Nov. 18, 1941 |
| 2,448,992 | Love et al. | Sept. 7, 1948 |
| 2,468,801 | Beall | May 3, 1949 |
| 2,482,203 | Peterson et al. | Sept. 20, 1949 |
| 2,509,526 | Reynolds, Jr. | May 30, 1950 |

FOREIGN PATENTS

| Number | Country | Date |
|---|---|---|
| 2,493 | Great Britain | Feb. 7, 1905 |
| 733,852 | France | Oct. 12, 1932 |